US012716462B2

(12) United States Patent
Van Lankvelt et al.

(10) Patent No.: US 12,716,462 B2
(45) Date of Patent: Aug. 25, 2026

(54) VIBRATION ISOLATOR FOR SUPPORTING A PAYLOAD

(71) Applicants: Carl Zeiss SMT GmbH, Oberkochen (DE); ASML Netherlands B.V., Veldhoven (NL)

(72) Inventors: Alexander Petrus Josephus Van Lankvelt, Veldhoven (NL); Michiel Vervoordeldonk, Veldhoven (NL); Pavel Kagan, Abtsgmuend (DE); Marc Wilhelmus Maria Van Der Wijst, Veldhoven (NL); Galip Tuna Turkbey, Veldhoven (NL); Marco Huiskamp, Veldhoven (NL); Ulrich Schoenhoff, Ulm (DE)

(73) Assignees: CARL ZEISS SMT GMBH, Oberkochen (DE); ASML NETHERLANDS B.V., Veldhoven (NL)

( * ) Notice: Subject to any disclaimer, the term of this patent is extended or adjusted under 35 U.S.C. 154(b) by 453 days.

(21) Appl. No.: 18/178,088

(22) Filed: Mar. 3, 2023

(65) Prior Publication Data

US 2023/0279919 A1 Sep. 7, 2023

(30) Foreign Application Priority Data

Mar. 3, 2022 (EP) .................................... 22160012

(51) Int. Cl.
*F16F 9/04* (2006.01)
*F16F 15/027* (2006.01)

(52) U.S. Cl.
CPC ............ *F16F 9/049* (2013.01); *F16F 15/027* (2013.01); *F16F 2222/126* (2013.01); *F16F 2224/046* (2013.01); *F16F 2230/42* (2013.01)

(58) Field of Classification Search
CPC ................................ F16F 9/049; F16F 15/027
See application file for complete search history.

(56) References Cited

U.S. PATENT DOCUMENTS 3,730,473 A * 5/1973 Pepi ...................... F16F 9/0209 267/136
3,889,936 A * 6/1975 Shimizu ................ F16F 15/027 267/64.23

(Continued)

FOREIGN PATENT DOCUMENTS

CN 107781350 B * 5/2019 ............ F16F 15/027
JP S63225741 A 9/1988

OTHER PUBLICATIONS

CN-107781350-B: English Machine Translation (Year: 2019).*

(Continued)

*Primary Examiner* — Melanie Torres Williams
(74) *Attorney, Agent, or Firm* — Edell, Shapiro & Finnan, LLC

(57) ABSTRACT

A vibration isolator (10; 210) for supporting a payload and isolating the payload from vibrations has a contact member (12) configured for supporting the payload, at least two pressurized gas compartments (24) arranged offset from each other to support the contact member at different locations, which pressurized gas compartments are connected to each other via a tubing system (54). The tubing system contains at least one restriction (66) at which a cross section of the tubing system is reduced by at least 50%.

18 Claims, 2 Drawing Sheets

(56) References Cited

U.S. PATENT DOCUMENTS

| | | | | |
|---|---|---|---|---|
| 5,071,108 | A * | 12/1991 | Houghton, Jr. | F16F 9/04 267/136 |
| 5,356,110 | A | 10/1994 | Eddy | |
| 5,918,862 | A * | 7/1999 | Nelson | F16F 9/04 267/121 |
| 6,123,312 | A * | 9/2000 | Dai | F16F 9/53 267/136 |
| 6,547,225 | B1 * | 4/2003 | Nelson | F16F 15/0275 248/631 |
| 6,926,263 | B1 * | 8/2005 | Nelson | F16F 15/0232 267/121 |
| 2006/0049557 | A1 | 3/2006 | Motz | |
| 2014/0061428 | A1 | 3/2014 | Chao et al. | |

OTHER PUBLICATIONS

Bilz, Membrane Air Springs BiAir, bilz.ag/en/membrane-air-springs/ downloaded on Dec. 10, 2021, 1 page.
European Search report, EP22160012, Sep. 13, 2022, 8 pages.

* cited by examiner

VIBRATION ISOLATOR FOR SUPPORTING A PAYLOAD

CROSS-REFERENCE TO RELATED APPLICATIONS

This application claims priority to the European Patent Application No. 22160012.5 filed on Mar. 3, 2022. The entire disclosure of this patent application is incorporated into the present application by reference.

FIELD OF THE INVENTION

The invention relates to a vibration isolator for supporting a payload and isolating the payload from vibrations.

BACKGROUND

Vibrations in the form of very low amplitude, omnidirectional motion are naturally present in any building, and are present at varying levels at all frequencies up to very high acoustic frequencies. The acceleration associated with such vibrations introduces stress into the structures of many types of sensitive equipment. For example, these vibrations may be introduced into sensitive elements of a measurement setup for measuring the quality of optical elements used in a microlithographic projection exposure tool and therewith reduce the measuring accuracy.

Vibration isolators may also be used to dampen the motion of the payload caused by movement of components supported by the payload. In the semiconductor industry, for example, it is common to have a heavy and fast-moving stage carrying a wafer, which stops at different locations on the wafer to make an inspection. The stage motion causes the payload to move on its isolators. The measurement, however, cannot be performed until this motion has died away. Therefore, it is critically important to the throughput of such systems that the isolators damp as quickly as possible.

U.S. Pat. No. 5,918,862 discloses a pneumatic vibration isolator comprising an air chamber comprising an opening containing a movable piston connected to a support plate for supporting a payload. A gap between the rim of the opening of the first air chamber and the piston is covered by an annular flexible rolling diaphragm or membrane. In order to support a very heavy payload several of the mentioned pneumatic vibration isolators may be arranged next to each other to support the payload at different locations. In this case a common support plate may be used such that the pistons of the different pneumatic vibration isolators contact the support plate at different locations.

In a common complication during the operation of the pneumatic vibration isolator the membrane of the air compartment may rupture causing a sudden drop in air pressure. In case only one pneumatic vibration isolator is used to support the payload, the latter will inevitably crash down causing a shock to the payload and possibly damaging it. In case several pneumatic vibration isolators are arranged next to each other to support the payload, rupture of the membrane in one vibration isolator causes a sudden increase in the load on the remaining vibration isolators. This in turn may lead to the membranes of these vibration isolators rupturing as well. This will also result in the payload crashing down.

SUMMARY

It is an object of the invention to provide a vibration isolator of the type set forth at the outset, with which the aforementioned problems are addressed and/or resolved. A further object is to provide a vibration isolator which is configured to better protect a sensitive payload from damage.

According to a first aspect of the invention, the aforementioned objects are addressed, for example, by a vibration isolator for supporting a payload and isolating the payload from vibrations, comprising: a contact member configured for supporting the payload, at least two pressurized gas compartments arranged next to each other to support the contact member at different locations, which pressurized gas compartments are connected to each other via a tubing system, wherein the tubing system contains at least one restriction at which a cross section of the tubing system is reduced by at least 50%. In certain situations, the cross section can be reduced by at least 70% or even by at least 90%.

The contact member may also be referred to as interface body. It may be configured as a plate, which may also be referred to as "support plate" for supporting the payload. The phrase "at which the cross section of the tubing system is reduced by at least 50%" means that at the restriction the respective portion of the tubing has a cross section which is at least 50% or any of the other percentages smaller than the cross section of the portions of the tubing adjacent to the restriction or the average cross section of the tubing system.

In case one of the gas compartments breaks and experiences a sudden drop in pressure, e.g. by rupturing a flexible membrane covering an opening of the gas compartment, a sudden drop of the payload can be prevented when using the vibration isolator according to the first aspect of the invention. Due to the provision of at least a second pressurized gas compartment arranged next to the other gas compartment as detailed above, the contact member is still held up by the later gas compartment.

The at least one second pressurized gas compartment, however, is typically not configured to support the payload without the first gas compartment and would potentially break as well. To prevent this, the gas compartments are connected to each other via the tubing system. Therefore, the at least one second gas compartment will also loose pressure by its gas flowing through the tubing system and being released through the broken gas compartment.

Due to the restriction in the tubing system, however, the gas flow to the broken gas compartment is limited. This is due to the fact that the reduced cross section of the restriction allows less flow of gas due to friction effects of the gas with the tube walls and the fact that the restriction causes turbulence in the gas flow. The restriction therefore causes a "soft landing" of the contact member. This way the sensitive payload can be protected from being damaged in case of one of the gas compartments breaking.

According to an embodiment, the vibration isolator comprises at least three, in particular at least four or at least nine, pressurized gas compartments connected via the tubing system, wherein each section of the tubing system connecting a respective pair of the pressurized gas compartments contains at least one restriction of the mentioned type. That means that each segment of the tubing system connecting a respective pair of the pressurized gas compartments contains at least one restriction at which a cross-section of the tubing system is reduced by at least 50%.

According to a further embodiment, the tubing system comprises connection tubes, each of which connection tubes connecting one of the gas compartments to a respective remaining part of the tubing system, wherein each connection tube contains at least one restriction of the mentioned type, i.e., a restriction at which a cross section of the tubing system is reduced by at least 50%.

According to a further embodiment, the vibration isolator further comprises a pressure supply device connected to the tubing system. The pressure supply device may be connected to the tubing system via a supply line.

According to a further embodiment, the vibration isolator further comprises a control valve configured to control a pressure supplied by an outlet of the control valve to the gas compartments based on a control signal and further comprising a damping chamber arranged such that the outlet of the control valve is connected to the tubing system via the damping chamber.

According to a second aspect of the invention, a vibration isolator for supporting a payload and isolating the payload from vibrations is provided, which vibration isolator comprises a pressurized gas compartment supporting a contact member configured to support the payload, a control valve configured to control a pressure supplied by an outlet of the control valve to the gas compartment based on a control signal, and a damping chamber arranged such that the outlet of the control valve is connected to the gas compartment via the damping chamber.

The control valve allows to implement a control loop for maintaining the payload at a set position. By providing the damping chamber the pressure changes initiated by the control loop can be dampened such that an overshooting of the control system is prevented. That means that the control loop operates more smoothly due to the damping chamber. In general, the damping chamber reduces pressure noise towards the gas compartment.

According to an embodiment, the damping chamber is connected to the gas compartment via a tube containing a restriction at which a cross section of the tube is reduced by at least 50%. The combination of the damping chamber and the restriction forms a low pass filter which allows overshooting of the control loop and pressure noise to be limited even better.

In an embodiment according to the second aspect of the invention, the vibration isolator comprises at least two pressurized gas compartments arranged next to each other to support the contact member at different locations, which pressurized gas compartments are connected to each other via a tubing system, wherein the tubing system contains at least one restriction at which a cross section of the tubing system is reduced by at least 50%. Embodiment variants described above with regard to the first aspect of the invention may be applied accordingly.

According to a further embodiment, the vibration isolator comprises at least three pressurized gas compartments connected via the tubing system, wherein each section of the tubing system, connecting a respective pair of the pressurized gas compartments, contains at least one restriction of the mentioned type.

According to a further embodiment, the tubing system comprises connection tubes, each of which connection tubes connecting one of the gas compartments to a respective remaining part of the tubing system, wherein each connection tube contains at least one restriction of the mentioned type.

In a further embodiment according to the first or the second aspect of the invention the damping chamber has a volume of at least 1 liter. In suitable situations, the damping chamber can have a volume of at least 3 liters or even at least 5 liters.

In a further embodiment according to the first or the second aspect of the invention the vibration isolator further comprises a position sensor configured to measure a position of the contact member over time and a control unit configured to generate the control signal based on the position measurement of the contact member. The position sensor may be configured to measure the position in real time.

In a further embodiment according to the first or the second aspect of the invention the vibration isolator further comprises a pressure supply device connected to the control valve via a further damping chamber.

According to a further embodiment a volume of the further damping chamber is larger than the volume of the first damping chamber. According to an embodiment variant the volume of the further damping chamber is at least 50% larger than the volume of the first damping chamber, or be even at least twice as large. For example, it may be at least 5 liters, even at least 10 liters or even at least 20 liters.

The features specified in respect of the embodiments, exemplary embodiments and embodiment variants etc., of the vibration isolator according to the invention, listed above and other features of the embodiments according to the invention are explained in the description of the figures and in the claims. The individual features can be implemented, either separately or in combination, as embodiments of the invention. Furthermore, they can describe advantageous embodiments which are independently protectable and protection for which is claimed if appropriate only during or after pendency of the application.

BRIEF DESCRIPTION OF THE DRAWINGS

The above and further advantageous features of the invention are illustrated in the following detailed description of exemplary embodiments according to the invention with reference to the accompanying schematic drawings. In the drawings.

DETAILED DESCRIPTION

In the exemplary embodiments or embodiments or embodiment variants described below, elements which are functionally or structurally similar to one another are provided with the same or similar reference signs as far as possible. Therefore, for understanding the features of the individual elements of a specific exemplary embodiment, reference should be made to the description of other exemplary embodiments or the general description.

Figure 1:
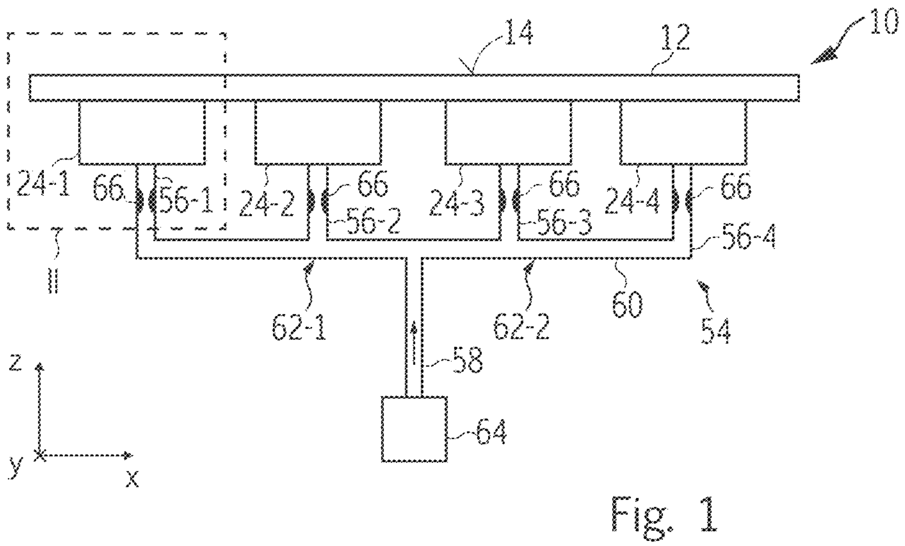
FIG. 1 depicts a schematic illustration of an embodiment of a vibration isolator according to a first aspect of the invention comprising four pressurized gas compartments arranged next to each other.

In order to facilitate the description, a Cartesian xyz-coordinate system is indicated in the drawing, from which system the respective positional relationship of the components illustrated in the figures is evident. In FIG. 1, the y-direction extends perpendicularly to the plane of the drawing into said plane, the x-direction extends toward the right, and the z-direction extends upward.

FIG. 1 shows a schematic illustration of an embodiment 10 of a vibration isolator according to a first aspect of the invention in form of a pneumatic vibration isolator for supporting a payload and isolating the payload from vibrations. At least one of such a vibration isolator 10 may be contained in a measuring setup for measuring the quality of optical elements, especially of EUV-mirrors, for a microlithographic projection exposure tool.

Such a measuring setup may be configured as an interferometric system. The vibration isolator 10 may be arranged in such a measuring setup to isolate the optical element to be tested from vibrations, i.e. the vibration isolator may be placed on a housing or base frame of the measurement setup and the optical element including its mount may be placed as payload on the vibration isolator. Other optical elements of the measurement setup may also be placed on a vibration isolator 10 in order to isolate the entire optical measurement path within the measurement setup from vibrations. Further, at least one vibration isolator may be contained within a microlithographic projection exposure tool, e.g. to isolate the projection objective or another optical system from vibrations. Such vibrations may especially be caused by the movement of stages used in the projection exposure tool to move a reticle and a wafer during the exposure process.

The vibration isolator 10 according to FIG. 1 comprises a contact member 12 having a contact surface 14. In the embodiment shown in FIG. 1 the contact member 12 is configured as a plate with its upper surface being the contact surface 14. The contact surface 14 serves for supporting the above-mentioned payload. The payload may by placed on the support surface 14 to be held in place by the friction created by its weight. Alternatively, the payload may be fixed to the support surface using fixation elements like bolts or screws, etc.

The vibration isolator 10 further comprises at least two pressurized gas compartments 24, arranged next to each other, supporting the contact member 12 at different locations in the x-y-plane. The vibration isolator 10 in the embodiment shown in FIG. 1 comprises four gas compartments 24-1, 24-2, 24-3 and 24-4, in other embodiments the number of gas compartments may be two, three, five, six, seven, eight, nine or more. The gas compartments 24 are arranged underneath the contact member 12 in order to support the contact member 12 and the payload arranged on the support surface 14 of the contact member 12. While the gas compartments 24 may be arranged in a row, as shown in FIG. 1, according to a preferable embodiment they are positioned in a two-dimensional arrangement in the x-y-plane. To this end, the four gas compartments 24-1 to 24-4 shown in FIG. 1 may be arranged in a 2×2 arrangement in the x-y-plane. According to an embodiment variant the gas compartments may be configured as gas compartments 24 of different volume sizes, such as two gas compartments 24-1 and 24-4 of a smaller volume size and two gas compartments 24-2 and 24-3 of a larger volume size, wherein the gas compartments are arranged such that each smaller gas compartment is positioned next to a larger gas compartment both in x- and in y-direction.

Figure 2:
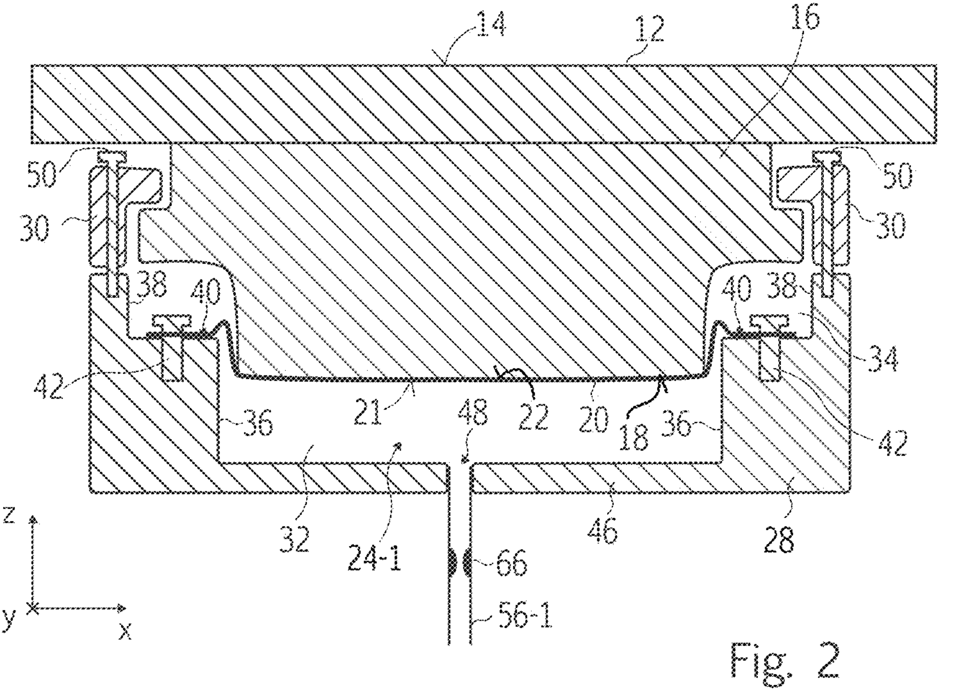
FIG. 2 shows a cross section of a detailed depiction of the area designated by II in FIG. 1 comprising one of the pressurized gas compartments.

FIG. 2 shows a detailed cross-sectional view of the area designated by II in FIG. 1 encompassing the outer left gas compartment 24-1 of the vibration isolator 10. The remaining gas compartments 24-2 to 24-4 are configured correspondingly according to the illustrated embodiment. The plate shaped contact member 12 is supported by a piston 16 of each of the gas compartments 24-1 to 24-4. The plate shaped contact member 12 may be fixed to the pistons 16 using fixation elements like bolts or screws. Alternatively, the pistons 16 may be configured integrally with the top plate such that the contact member 12 is a one-piece structure encompassing the top plate and the pistons for the respective gas compartments 24.

The piston 16, as illustrated in FIG. 2, comprises a bottom surface 18 which is in contact with a top surface, also referred to as outer surface 22, of a flexible membrane 20. The membrane 20 is made using an elastic material, e.g. an fluorocarbon-based fluoroelastomer, such as Viton®. According to an embodiment the membrane 20 is composed of an fluorocarbon-based fluoroelastomer and fiber layers are arranged in two axes perpendicular to each other to increase the strength of the membrane. The bottom surface 18 is in contact with the outer surface 22 of the membrane 20 over an extended area, e.g. the bottom surface 18 may cover at least 50% or at least 80% of the outer surface 22 of the membrane 20.

The pressurized gas compartment 24-1 is formed by a rigid base structure 28 and the membrane 20 covers an opening of the base structure 28. The pressurized gas compartment 24 can be filled with pressurized air or any other pressurized gas or gas mixture.

The base structure 28 according to FIG. 1 is configured as a cylindrical object being rotationally symmetrical to a vertical axis. The cylindrical object forming the base structure 28 has a first central cylindrical cutout 32, which essentially provides the space inside the gas compartment 24-1. The cylindrical cutout 32 is rotationally symmetrical to the vertical axis.

The gas compartment 24-1 is surrounded by a circular side wall 36 of the base structure 28. The cylindrical object forming the base structure 28 has a second cylindrical cutout 34 having a larger radius than the first cylindrical cutout 32, also being rotationally symmetrical to the vertical axis and being arranged above the gas compartment 24-1. The sidewall 36 of the first cutout 32 is connected with the sidewall 38 of the second cutout 34 by a horizontal shoulder area 40.

The membrane 20 may be attached to the shoulder area 40, e.g., by bolts 42 or screws as shown in FIG. 2. In other words, the opening in the base structure 28 formed by the first cutout 32 is covered with the membrane 20. Here, the membrane 20 is attached loosely, i.e., without tension, such that the gas compartment 24 can be inflated and deflated. An inner surface 21 of the membrane 20 faces into the gas compartment 24-1 and forms the roof of the gas compartment 24-1.

A bottom part 46 of the base structure 28 within the circle formed by the sidewall 36 forms a floor of the gas compartment 24-1. The base structure 28, in the embodiment according to FIG. 1 the bottom part 46, has an opening 48 to the gas compartment 24-1. Through this opening 48 the gas compartment 24-1 is provided with the pressurized air as explained below in detail. The pressurized air may e.g. have a pressure of more than 2 bar, especially a pressure of about 4 bar, wherein the environment can be vacuum, i.e. have a pressure of virtually 0 bar. By varying the supply pressure, the gas compartment 24-1 can be inflated and deflated.

FIG. 2 shows an operating state in which the gas compartment 24-1 is inflated to a predefined level. In the operating state the piston 16 is lifted up to a level, at which it is freely floating within the space provided between the base structure 28 and a bracket 30. In the shown embodiment the bracket 30 is ring-shaped around the vertical axis and attached by bolts 50 to a top ring-shaped section 52 of the base structure 28. Alternatively, several punctiform brackets may be arranged around the ring-shaped section 52.

As mentioned above, in the operating state the support member 12 is freely floating within the space provided between the base structure 28 and the bracket 30. During operation of the vibration isolator 10 vibrations are absorbed by small up and down movements of the membranes 20 in the gas compartments 24-1 to 24-4 slightly compressing and decompressing the respective gas compartment 24.

Each of the gas compartments 24-1 to 24-4 is connected to a tubing system 54 supplying the gas compartments 24 with pressurized air. The tubing system 54 comprises connection tubes 56-1 to 56-4, each of which connecting one of the gas compartments 24-1 to 24-4 to the respective remaining part of the tubing system 54. The tubing system 54 further comprises a pressure supply tube 58 and a distribution tube 60.

On one end the pressure supply tube 60 is connected to a pressure supply device 64 and on the other end to a distribution tube 60 connecting the pressure supply tube 58 to the connection tubes 56-1 to 56-4. For this purpose, the distribution tube has T-tube sections 62-1 and 62-2 on both ends. The T-tube section 62-1 provides a connection to the connection tubes 56-1 and 56-2 and the T-Tube section 62-2 provides a connection to the connection tubes 56-3 and 56-4.

As mentioned above, each of the connection tubes 56-1 to 56-4 connects one of the gas compartments 24-1 to 24-4 to the respective remaining part of the tubing system 54. In case of the connection tube 56-1, for example, the remaining part of the tubing system 54 comprises the other connection tubes 56-2 to 56-4, the distribution tube 60 and the pressure supply tube 58.

The tubing system 54 contains at least one restriction 66, in the shown embodiment each connection tube 56 contains one restriction 66. According to another embodiment the tubing system 54 contains only three restrictions 66, i.e., one restriction 66 less than there are connection tubes 56. These restrictions 66 are arranged such that each section of the tubing system 54 connecting a respective pair of the pressurized gas compartments 56 contains one restriction 66. In case of the gas compartments 56-1 and 56-2 this section comprises the connection tubes 56-1 and 56-2 and the connection segment of the T-tube section 62-1.

This way it is ensured that each tubal connection between any of the gas compartments 56 contains at least one restriction 66. For example, in case only the connection tubes 56-1, 56-2 and 56-3 each contain a restriction 66 and the connection tube 56-4 does not contain a restriction, air flowing from the gas compartment 24-1 to any of the gas compartments 24-2 to 24-4, air flowing from the gas compartment 24-2 to the gas compartment 24-3 or 24-4 and air flowing from the gas compartment 24-3 to the gas compartment 24-4 in each case passes through one of the restrictions 66.

The restrictions 66 in the tubing system 54 are configured such that a cross section of the tubing system 54 at the respective restriction 66 is reduced by at least 50%, at least 70% or at least 90%. That means that at the restriction 66 the respective portion of the tubing 54 has a cross section which is smaller by at least the given percentage than the cross section of the portions of the tubing adjacent to the restriction 66 or the average cross section of the tubing system 54. In the embodiment shown in FIG. 1 at least the connection tubes 56-1 to 56-4 and the distribution tube 60 have the same cross section, with the only exception of the restrictions 66 which have a reduced cross section.

In case the membrane 20 ruptures in one of the gas compartments 24-1 to 24-4, e.g., gas compartment 24-1, of the vibration isolator 10 causing a sudden drop in pressure in the respective gas compartment 24-1 the presence of the other gas compartments 24-2 to 24-4 and of the restrictions 66 prevents a sudden drop of the contact member 12. This way a shock and resulting damage to the payload can be prevented.

Although the other gas compartments 24-2 to 24-4 are not configured to support the payload without the ruptured gas compartment 24-1, they effect a slow touchdown of the payload after the pressure drop in the ruptured gas compartment 24-1. The other gas compartments 24-2 to 24-4 loose pressure as well, but slowly, by its gas flowing through the tubing system 54 to the ruptured gas compartment 24-1 and being released there.

Due to the restrictions 66 in the connection tubes 56, however, the gas flow to the gas compartment 24-1 is limited. This is due to the fact that the reduced cross section of the restrictions 66 allows less gas to flow due to friction effects of the gas with the tube walls and the fact that the restriction causes turbulence in the gas flow. The restriction 66 therefore causes a "soft landing" of the contact member 12.

Figure 3:
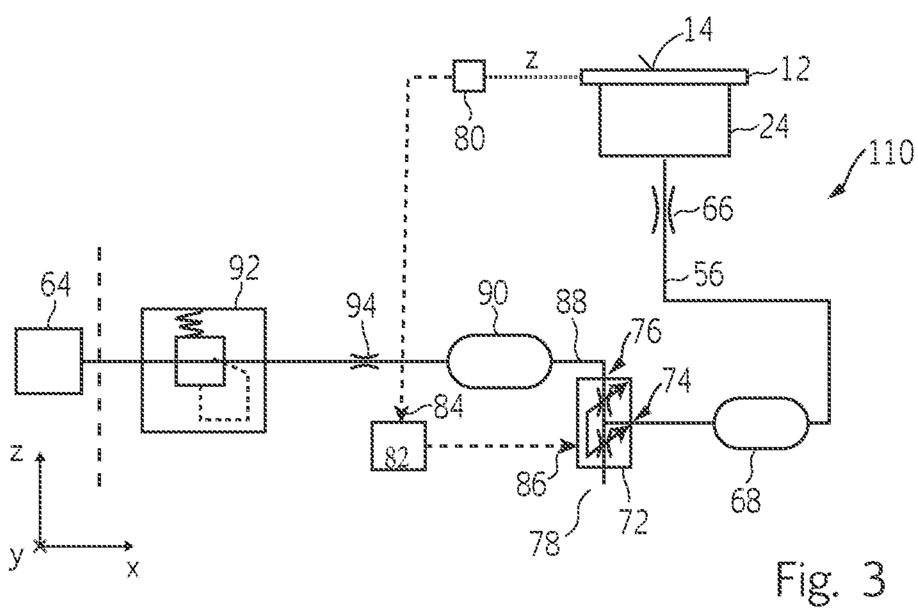
FIG. 3 shows a schematic illustration of a further embodiment of a vibration isolator according to a second aspect of the invention comprising a pressurized gas compartment and a control valve configured to control a pressure supplied by an outlet of the control valve to the gas compartment.

FIG. 3 shows a schematic illustration of an embodiment 110 of a vibration isolator according to a second aspect of the invention in form of a pneumatic vibration isolator for supporting a payload and isolating the payload from vibrations. Just like the vibration isolator 10 according to FIG. 1 at least one of such a vibration isolator 110 may be contained in a measuring setup for measuring the quality of optical elements, especially of EUV-mirrors, for a microlithographic projection exposure tool.

The vibration isolator 10 according to FIG. 3 comprises a contact member 12 having a contact surface 14 for supporting the payload and only one pressurized gas compartment 24. The pressurized gas compartment 24 including the setup surrounding it may be configured as shown in FIG. 2 with the exception that the contact member 12 is a plate adjusted to the size of only one gas compartment 24 instead of four gas compartments 24 according to FIG. 1.

The gas compartment 24 according to FIG. 3 is connected to a damping chamber 68, also referred to as damping tank, by a connection tube 56 having a restriction 66. The volume of the damping chamber 68 is set to be smaller, in particular at least three times smaller, than the volume of the gas compartment 24. According to an embodiment, the volume of the gas compartment 24 is approximately 7 liters and the volume of the damping chamber is approximately 2 liters. According to another embodiment the volume of the gas compartment is approximately 30 liters and the volume of the damping chamber is approximately 5 liters.

The damping chamber 58 is further connected to an outlet port 74, also just referred to as "outlet", of a control valve 72 by a further tube 70. In other words, the damping chamber 58 is arranged such that the outlet 74 of the control valve 72 is connected to the gas compartment via the damping chamber 58.

The control valve 72 is configured to control the pressure supplied to the gas compartment 24 by the outlet 74, also referred to as outlet pressure, by suitably reducing a pressure supplied to an inlet port 76 of the control valve 72 by a pressure supply line 88. The control valve 72 further has a ventilation port 78 to the ambient air and two valve units which can be set appropriately to adjust the pressure at the outlet by releasing an appropriate amount of air through the ventilation port 78.

The control valve 72 is part of a control loop comprising a position sensor 80 and a control unit 82. The position sensor 80, which may be an optical sensor, measures the position 84 of the contact member 12 in z-direction, i.e., the height position of the contact member 12, in real time and forwards the position to the control unit 82. The control unit 82 determines a deviation of the measured position 84 from a setpoint and establishes a control signal 86 forwarded to the control valve 72 in order to adjust the pressure at the outlet port 76 adequately to bring the contact member 12 back to the setpoint.

In other words, the control valve 72 allows to implement a control loop for maintaining the payload at a set position. The damping chamber 68 serves the purpose of damping the pressure changes initiated by the control loop such that an overshooting of the control system is prevented. That means that the control loop operates more smoothly due to the damping chamber 68. In general, it can be said, that the damping chamber reduces pressure noise towards the gas compartment 24.

The pressure supply line 88 connects a further damping chamber 90 with the inlet port 76 of the control valve 72. The damping chamber 90 is further connected to a pressure supply device 64 via a pressure reducing valve 92 and a restriction 94. The volume of the damping chamber 90 is larger than the volume of the damping chamber 68, in particular twice as large, e.g., 20 liters. The pressure reducing valve 92 and the restriction 94 serve the purpose of providing a stable and disturbance-free pressure to the pressure supply line 88.

Figure 4:
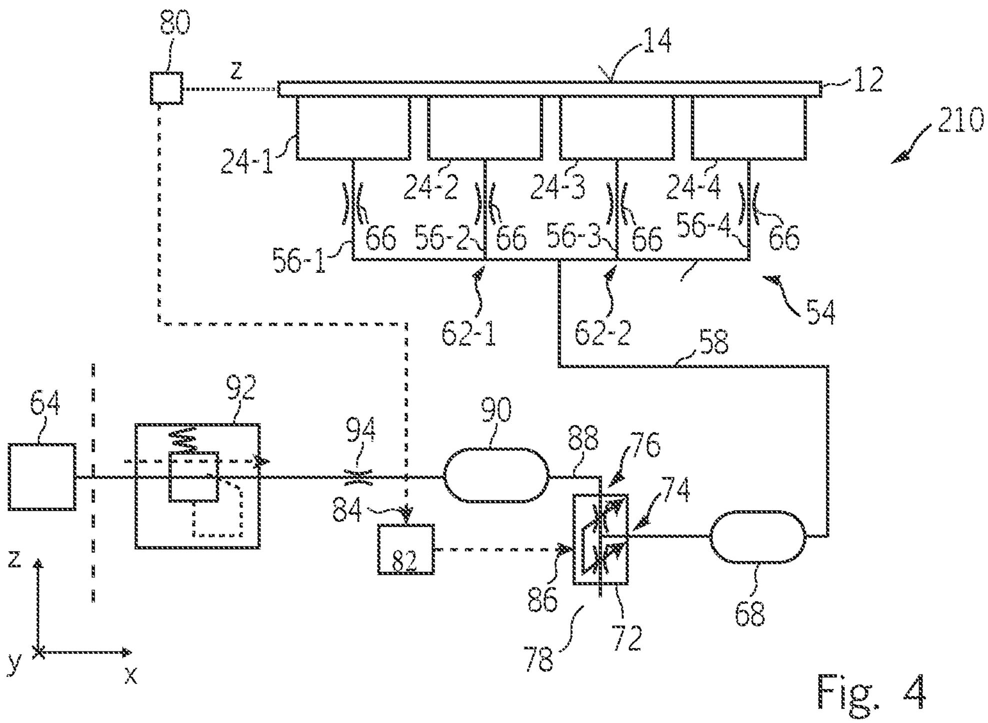
FIG. 4 shows a schematic illustration of a further embodiment of a vibration isolator combining features of the first and the second aspects of the invention.

FIG. 4 shows a schematic illustration of an embodiment 210 of a vibration isolator which combines elements according to the first and the second aspect of the invention by having four gas compartments 24-1 to 24-4 including respective restrictions 66 according to the embodiments of FIG. 1 and a control loop including a control valve 72 and a damping chamber 68 according to the embodiment of FIG. 3. Therefore, reference is made to the above text describing the respective elements. The vibration isolator 210 therefore has the advantage of providing for a "soft landing" of the contact member 12 in case of a membrane rupture in one of the gas compartments 24-1 to 24-4 and a stable control of the height position of the contact member 12 during normal operation.

The above description of exemplary embodiments, embodiments or embodiment variants is to be understood to be by way of example. The disclosure effected thereby firstly enables the person skilled in the art to understand the present invention and the advantages associated therewith, and secondly encompasses alterations and modifications of the described structures and methods that would be within the skill and understanding of the person skilled in the art. Therefore, all such alterations and modifications, insofar as they fall within the scope of the invention in accordance with the definition in the accompanying claims, and equivalents are intended to be covered by the protection of the claims.

LIST OF REFERENCE SIGNS

10 vibration isolator
12 contact member
14 support surface
16 piston
18 bottom surface
20 membrane
21 inner surface
22 outer surface
24-1, 24-2, 24-3, 24-4 gas compartments
28 base structure
30 bracket
32 first cutout
34 second cutout
36 sidewall of first cutout
38 sidewall of second cutout
40 shoulder area
42 bolt
46 bottom part
48 opening
50 bolt
52 top ring-shaped section of the base structure
54 tubing system
56 connection tube
58 pressure supply tube
60 distribution tube
62-1, 62-2 T-tube sections
64 pressure supply device
66 restriction
68 damping chamber
70 tube
72 control valve
74 outlet port
76 inlet port
78 ventilation port
80 position sensor
82 control unit
84 position
86 control signal
88 pressure supply line
90 further damping chamber
92 pressure reducing valve
94 restriction
110 vibration isolator
210 vibration isolator

What is claimed is:

1. A vibration isolator for supporting a payload and isolating the payload from vibrations, comprising:
a contact member configured for supporting the payload,
at least two pressurized gas compartments arranged offset from each other to support the contact member at different locations, which pressurized gas compartments are connected to each other via a tubing system, wherein the tubing system has a non-uniform cross section and contains at least one restriction at which the cross section of the tubing system is reduced by at least 50%; and
a control valve configured to control a pressure supplied by an outlet of the control valve to the gas compartments based on a control signal and further comprising a damping chamber arranged such that the outlet of the control valve is connected to the tubing system via the damping chamber.

2. The vibration isolator according to claim 1, further comprising at least a third pressurized gas compartment,
wherein the at least three pressurized gas compartments are interconnected via respective sections of the tubing system, wherein each section of the tubing system connecting a respective pair of the pressurized gas compartments contains at least one restriction at which the cross section of the respective section of the tubing system is reduced by at least 50%.

3. The vibration isolator according to claim 1,
wherein the tubing system comprises connection tubes,
wherein each of the connection tubes connects a respective one of the gas compartments to a respective remaining part of the tubing system, and
wherein each of the connection tubes contains at least one of the at least one restriction at which the cross section of the respective section of the tubing system is reduced by at least 50%.

4. The vibration isolator according to claim 1, further comprising a pressure supply device connected to the tubing system.

5. The vibration isolator according to claim 1,
wherein the damping chamber is connected to the gas compartment via a tube containing a restriction at which a cross section of the tube is reduced by at least 50%.

6. The vibration isolator according to claim 1,
wherein the damping chamber has a volume of at least 1 liter.

7. The vibration isolator according to claim 1,
further comprising a position sensor configured to measure a position of the contact member over time and a control unit configured to generate the control signal based on a measured position of the contact member.

8. The vibration isolator according to claim 1, further comprising a pressure supply device connected to the control valve via a further damping chamber.

9. The vibration isolator according to claim 8,
wherein the damping chamber has a volume of at least 1 liter, and
wherein a volume of the further damping chamber is larger than the volume of the first damping chamber.

10. A vibration isolator for supporting a payload and isolating the payload from vibrations, comprising:
a pressurized gas compartment supporting a contact member configured to support the payload,
a control valve configured to control a pressure supplied by an outlet of the control valve to the gas compartment based on a control signal,
a damping chamber arranged such that the outlet of the control valve is connected to the gas compartment via the damping chamber, and
at least a second pressurized gas compartment arranged offset from the pressurized gas compartment to support the contact member at different locations,
wherein the pressurized gas compartments are interconnected via a tubing system, and
wherein the tubing system has a non-uniform cross section and contains at least one restriction at which the cross section is reduced by at least 50%.

11. The vibration isolator according to claim 10,
wherein the damping chamber is connected to the gas compartment via a tube that has a non-uniform cross section and that contains a restriction at which the cross section is reduced by at least 50%.

12. The vibration isolator according to claim 10, further comprising at least a third pressurized gas compartment,
wherein the at least three pressurized gas compartments are interconnected via respective sections of the tubing system, and
wherein each section of the tubing system connecting a respective pair of the pressurized gas compartments contains at least one of the least one restriction at which the cross section of the respective section is reduced by at least 50%.

13. The vibration isolator according to claim 10,
wherein the tubing system comprises connection tubes,
wherein each of the connection tubes connects a respective one of the gas compartments to a respective remaining part of the tubing system, and
wherein each of the connection tubes contains at least one restriction at which the cross section of the respective connection tube is reduced by at least 50%.

14. The vibration isolator according to claim 10,
wherein the damping chamber has a volume of at least 1 liter.

15. The vibration isolator according to claim 10,
further comprising a position sensor configured to measure a position of the contact member over time and a control unit configured to generate the control signal based on a measured position of the contact member.

16. The vibration isolator according to claim 10, further comprising a pressure supply device connected to the control valve via a further damping chamber.

17. The vibration isolator according to claim 16,
wherein the damping chamber has a volume of at least 1 liter, and
wherein a volume of the further damping chamber is larger than the volume of the first damping chamber.

18. A vibration isolator for supporting a payload and isolating the payload from vibrations, comprising:
a pressurized gas compartment supporting a contact member configured to support the payload,
a control valve configured to control a pressure supplied by an outlet of the control valve to the gas compartment based on a control signal,
a damping chamber arranged such that the outlet of the control valve is connected to the gas compartment via the damping chamber, and
a pressure supply device connected to the control valve via a further damping chamber.

* * * * *